US011518475B2

(12) United States Patent
Shahana et al.

(10) Patent No.: US 11,518,475 B2
(45) Date of Patent: Dec. 6, 2022

(54) CONTROL DEVICE AND TRANSMISSION SYSTEM

(71) Applicant: Shimano Inc., Osaka (JP)

(72) Inventors: Satoshi Shahana, Osaka (JP); Mitsuhiko Kawasaki, Osaka (JP)

(73) Assignee: Shimano Inc., Osaka (JP)

( * ) Notice: Subject to any disclaimer, the term of this patent is extended or adjusted under 35 U.S.C. 154(b) by 248 days.

(21) Appl. No.: 16/901,570

(22) Filed: Jun. 15, 2020

(65) Prior Publication Data
US 2021/0009234 A1 Jan. 14, 2021

(30) Foreign Application Priority Data

Jul. 8, 2019 (JP) .............................. JP2019-126978
Dec. 26, 2019 (JP) .............................. JP2019-236230

(51) Int. Cl.
B62M 9/123 (2010.01)
B62M 6/45 (2010.01)
B62M 9/122 (2010.01)
B62M 6/55 (2010.01)

(52) U.S. Cl.
CPC .............. B62M 9/123 (2013.01); B62M 6/45 (2013.01); B62M 9/122 (2013.01); B62M 6/55 (2013.01)

(58) Field of Classification Search
CPC ...... B62M 25/08; B62M 9/122; B62M 9/123; B62M 9/133; B62M 9/132
USPC ......................................................... 474/70
See application file for complete search history.

(56) References Cited

U.S. PATENT DOCUMENTS

| 3,929,025 | A | * | 12/1975 | Perry | ..................... B62M 9/123 474/81 |
| 5,213,548 | A | * | 5/1993 | Colbert | .................. B62M 25/08 280/238 |
| 6,015,159 | A | * | 1/2000 | Matsuo | .................. B62M 25/00 280/238 |
| 6,884,190 | B2 | * | 4/2005 | Takebayashi | .......... B62M 9/122 701/55 |
| 7,900,946 | B2 | * | 3/2011 | Hara | ...................... B62M 25/08 280/238 |
| 9,189,454 | B2 | * | 11/2015 | Fukushima | ............. G06F 17/00 |
| 9,278,728 | B1 | * | 3/2016 | Sato | ....................... B62M 9/122 |
| 10,167,056 | B2 | * | 1/2019 | Hashimoto | ............ B62M 9/123 |

(Continued)

FOREIGN PATENT DOCUMENTS

JP 2003-120799 A 4/2003
JP 2005-96537 A 4/2005

Primary Examiner — Henry Y Liu
(74) Attorney, Agent, or Firm — Global IP Counselors, LLP

(57) ABSTRACT

A control device includes an electronic controller configured to control a transmission to shift a transmission ratio of a human-powered vehicle in accordance with a first shifting condition set based on a first reference value. The electronic controller is configured to control the transmission to restrict shifting of the transmission ratio of the human-powered vehicle regardless of the first shifting condition upon determining a second shifting condition set based on a second reference value is satisfied. The second reference value includes at least one of a reference value indicating an acceleration tendency of the human-powered vehicle and a reference value indicating a deceleration tendency of the human-powered vehicle.

19 Claims, 9 Drawing Sheets

(56) References Cited

U.S. PATENT DOCUMENTS

| | | | |
|---|---|---|---|
| 2003/0232680 A1* | 12/2003 | Matsunaga | F16H 61/0213 475/131 |
| 2004/0176895 A1* | 9/2004 | Takeda | B62M 25/08 701/55 |
| 2004/0176896 A1* | 9/2004 | Takeda | B62M 9/132 701/55 |
| 2007/0179694 A1* | 8/2007 | McMullen | B60W 50/14 701/51 |
| 2012/0130603 A1* | 5/2012 | Simpson | B62M 25/08 701/51 |
| 2013/0158941 A1* | 6/2013 | Yang | G01C 21/206 73/1.38 |
| 2015/0224977 A1* | 8/2015 | Sata | F16H 61/04 701/54 |
| 2016/0014252 A1* | 1/2016 | Biderman | B60L 3/0061 701/29.2 |
| 2016/0075177 A1* | 3/2016 | Biderman | B60L 58/21 301/6.5 |
| 2016/0101827 A1* | 4/2016 | Usui | B62M 25/08 701/51 |
| 2016/0200396 A1* | 7/2016 | Baumann | B62M 9/123 474/70 |
| 2016/0375957 A1* | 12/2016 | Hashimoto | B62M 9/122 474/70 |
| 2016/0375958 A1* | 12/2016 | Hashimoto | B62M 9/123 701/58 |
| 2017/0050702 A1* | 2/2017 | Grassi | B62M 9/133 |
| 2017/0051828 A1* | 2/2017 | Zhang | B62J 45/412 |
| 2018/0111661 A1* | 4/2018 | Wesling | B62M 9/123 |
| 2018/0178881 A1* | 6/2018 | Miglioranza | B62M 9/122 |
| 2018/0244258 A1* | 8/2018 | Mouri | B60W 10/08 |
| 2018/0257743 A1* | 9/2018 | Tsuchizawa | B62J 45/415 |
| 2019/0009780 A1* | 1/2019 | Komatsu | B62M 25/08 |
| 2020/0346714 A1* | 11/2020 | Hahn | B62J 45/414 |

* cited by examiner

CONTROL DEVICE AND TRANSMISSION SYSTEM

CROSS-REFERENCE TO RELATED APPLICATIONS

This application claims priority to Japanese Patent Application No. 2019-126978, filed on Jul. 8, 2019 and Japanese Patent Application No. 2019-236230, filed on Dec. 26, 2019. The entire disclosures of Japanese Patent Application No. 2019-126978 and Japanese Patent Application No. 2019-236230 are hereby incorporated herein by reference.

BACKGROUND

Technical Field

The present invention generally relates to a control device and a transmission system.

Background Information

A known transmission control device controls a transmission based on detection results of a plurality of traveling states of a human-powered vehicle. Japanese Laid-Open Patent Publication No. 2005-96537 (Patent Document 1) describes a transmission control device configured to change a transmission ratio of a human-powered vehicle in a case where detection results of a plurality of traveling states all exceed threshold values.

SUMMARY

One object of the present disclosure is to provide a control device and a transmission system that allow for comfortable traveling with the human-powered vehicle.

A control device in accordance with a first aspect of the present disclosure comprises an electronic controller configured to control a transmission to shift a transmission ratio of a human-powered vehicle in accordance with a first shifting condition set based on a first reference value. The electronic controller is configured to control the transmission to restrict shifting of the transmission ratio of the human-powered vehicle regardless of the first shifting condition upon determining a second shifting condition set based on a second reference value is satisfied. The second reference value includes at least one of a reference value indicating an acceleration tendency of the human-powered vehicle and a reference value indicating a deceleration tendency of the human-powered vehicle.

With the control device in accordance with the first aspect, the transmission is controlled based on at least one of the reference value indicating the acceleration tendency and the reference value indicating the deceleration tendency. This allows for comfortable traveling with the human-powered vehicle.

In accordance with a second aspect of the present disclosure, the control device according to the first aspect is configured so that the second reference value includes the acceleration of the human-powered vehicle, and the electronic controller is configured to determine that the second shifting condition is satisfied and restrict the shifting of the transmission ratio of the human-powered vehicle upon determining the acceleration of the human-powered vehicle is greater than or equal to a first predetermined value.

With the control device in accordance with the second aspect, shifting of the transmission ratio is restricted in a case where the human-powered vehicle is accelerating at an acceleration that is greater than or equal to the first predetermined value. This allows for comfortable traveling with the human-powered vehicle.

In accordance with a third aspect of the present disclosure, the control device according to the second aspect is configured so that the electronic controller is configured to determine that the second shifting condition is satisfied and is configured to restrict a first shifting that decreases the transmission ratio of the human-powered vehicle upon determining the acceleration of the human-powered vehicle is greater than or equal to the first predetermined value.

With the control device in accordance with the third aspect, decreasing of the transmission ratio is restricted in a case where the human-powered vehicle is accelerating at an acceleration that is greater than or equal to the first predetermined value. This allows for comfortable traveling with the human-powered vehicle.

In accordance with a fourth aspect of the present disclosure, the control device according to any one of the first to third aspect is configured so that the second reference value includes the deceleration of the human-powered vehicle, and the electronic controller is configured to determine that the second shifting condition is satisfied and is configured to restrict the shifting of the transmission ratio of the human-powered vehicle upon determining the deceleration of the human-powered vehicle is greater than or equal to a second predetermined value.

With the control device in accordance with the fourth aspect, shifting of the transmission ratio is restricted in a case where the human-powered vehicle is decelerating at a deceleration that is greater than or equal to the second predetermined value. This allows for comfortable traveling with the human-powered vehicle.

In accordance with a fifth aspect of the present disclosure, the control device according to the fourth aspect is configured so that the electronic controller is configured to determine that the second shifting condition is satisfied and is configured to restrict second shifting that increases the transmission ratio of the human-powered vehicle upon determining the deceleration of the human-powered vehicle is greater than or equal to the second predetermined value.

With the control device in accordance with the fifth aspect, increasing of the transmission ratio is restricted in a case where the human-powered vehicle is decelerating at a deceleration that is greater than or equal to the second predetermined value. This allows for comfortable traveling with the human-powered vehicle.

In accordance with a sixth aspect of the present disclosure, the control device according to any one of the first to fifth aspects is configured so that the first shifting condition includes a first threshold value and a second threshold value that is smaller than the first threshold value. The electronic controller is configured to perform a second shifting that increases the transmission ratio of the human-powered vehicle upon determining the first reference value is greater than or equal to the first threshold value. The electronic controller is configured to perform a first shifting that decreases the transmission ratio of the human-powered vehicle upon determining the first reference value is less than or equal to the second threshold value.

The control device in accordance with the sixth aspect shifts the transmission ratio based on the relationship of the first reference value and the first threshold value and the relationship of the first reference value and the second threshold value. This allows for comfortable traveling with the human-powered vehicle.

In accordance with a seventh aspect of the present disclosure, the control device according to any one of the first to sixth aspects is configured so that the second reference value differs from the first reference value.

The control device in accordance with the seventh aspect shifts the transmission ratio of the human-powered vehicle in a suitable manner.

In accordance with an eighth aspect of the present disclosure, the control device according to any one of the first to seventh aspects is configured so that the first reference value includes at least one of a cadence, a torque acting on a crank of the human-powered vehicle, a power, and a vehicle speed of the human-powered vehicle.

The control device in accordance with the eighth aspect shifts the transmission ratio of the human-powered vehicle in a suitable manner.

In accordance with a ninth aspect of the present disclosure, the control device according to the eighth aspect is configured so that the first reference value includes the cadence, and the electronic controller is configured to restrict a second shifting that increases the transmission ratio of the human-powered vehicle upon determining the cadence is greater than or equal to a third threshold value that is greater than the first threshold value.

With the control device in accordance with the ninth aspect, second shifting is restricted in a case where the cadence incidentally increases. This allows for comfortable traveling with the human-powered vehicle.

In accordance with a tenth aspect of the present disclosure, the control device according to the eighth or ninth aspect is configured so that the first reference value includes the vehicle speed, and the electronic controller is configured to calculate an estimated cadence of the human-powered vehicle from the vehicle speed.

With the control device in accordance with the tenth embodiment, the transmission can be controlled by referring to cadence even if the human-powered vehicle does not include a sensor for measuring cadence.

In accordance with an eleventh aspect of the present disclosure, the control device according to the tenth aspect is configured so that the first reference value further includes the cadence and the torque acting on the crank of the human-powered vehicle, and the electronic controller is configured to determine whether or not the first shifting condition is satisfied based on the estimated cadence upon determining the torque is less than or equal to a third predetermined value.

With the control device in accordance with the eleventh aspect, the estimated cadence is selected instead of the actual cadence as the first reference value. This allows for the determination of whether or not the first shifting condition is satisfied to be performed in a further preferred manner.

In accordance with a twelfth aspect of the present disclosure, the control device according to any one of the first to eleventh aspects is configured so that the electronic controller is configured to determine whether or not the first shifting condition is satisfied every predetermined period and is configured to shift the transmission ratio of the human-powered vehicle upon determining the first shifting condition is satisfied a predetermined number of times.

The control device in accordance with the twelfth aspect shifts the transmission ratio of the human-powered vehicle in a case where the first shifting condition is satisfied a predetermined number of times. This allows for comfortable traveling with the human-powered vehicle.

In accordance with a thirteenth aspect of the present disclosure, the control device according to the twelfth aspect is configured so that the predetermined period is set by rotation of a crank of the human-powered vehicle.

The control device in accordance with the thirteenth aspect allows for determination that the first shifting condition has been satisfied a predetermined number of times in a suitable manner.

In accordance with a fourteenth aspect of the present disclosure, the control device according to the twelfth or thirteenth aspect is configured so that the predetermined number of times is three times.

The control device in accordance with the fourteenth aspect allows for comfortable traveling with the human-powered vehicle.

In accordance with a fifteenth aspect of the present disclosure, the control device according to any one of the first to fourteenth aspects is configured so that the second reference value includes an acceleration of the human-powered vehicle, and the electronic controller is configured to determine whether or not the second shifting condition is satisfied based on a plurality of accelerations of the human-powered vehicle calculated at predetermined intervals.

The control device in accordance with the fifteenth aspect accurately is configured to determine whether or not the second shifting condition is satisfied. This allows for comfortable traveling with the human-powered vehicle.

In accordance with a sixteenth aspect of the present disclosure, the control device according to the fifteenth aspect is configured so that the electronic controller is configured to determine that the second shifting condition is satisfied and is configured to restrict the shifting of the transmission ratio of the human-powered vehicle upon determining at least one of successive ones of the plurality of accelerations of the human-powered vehicle is greater than or equal to a first predetermined value.

The control device in accordance with the sixteenth aspect allows for comfortable traveling with the human-powered vehicle.

In accordance with a seventeenth aspect of the present disclosure, the control device according to any one of the first to sixteenth aspects is configured so that the second reference value includes a deceleration of the human-powered vehicle, and the electronic controller is configured to determine whether or not the second shifting condition is satisfied based on a plurality of decelerations of the human-powered vehicle calculated at predetermined intervals.

The control device in accordance with the seventeenth aspect accurately is configured to determine whether or not the second shifting condition is satisfied. This allows for comfortable traveling with the human-powered vehicle.

In accordance with an eighteenth aspect of the present disclosure, the control device according to the seventeenth aspect is configured so that the electronic controller is configured to determine that the second shifting condition is satisfied and is configured to restrict the shifting of the transmission ratio of the human-powered vehicle upon determining at least one of successive ones of the plurality of decelerations of the human-powered vehicle is greater than or equal to a second predetermined value.

The control device in accordance with the eighteenth aspect allows for comfortable traveling with the human-powered vehicle.

A transmission system in accordance with a nineteenth aspect of the present disclosure comprises the control device according to any one of the first to eighteenth aspects, and the transmission system further comprises the transmission.

With the transmission system in accordance with the nineteenth aspect, shifting of the transmission ratio of the human-powered vehicle is restricted in a case where the second shifting condition, which is set based on a second reference value, is satisfied. This allows for comfortable traveling with the human-powered vehicle.

The control device and the transmission system in accordance with the present disclosure allow for comfortable traveling with a human-powered vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
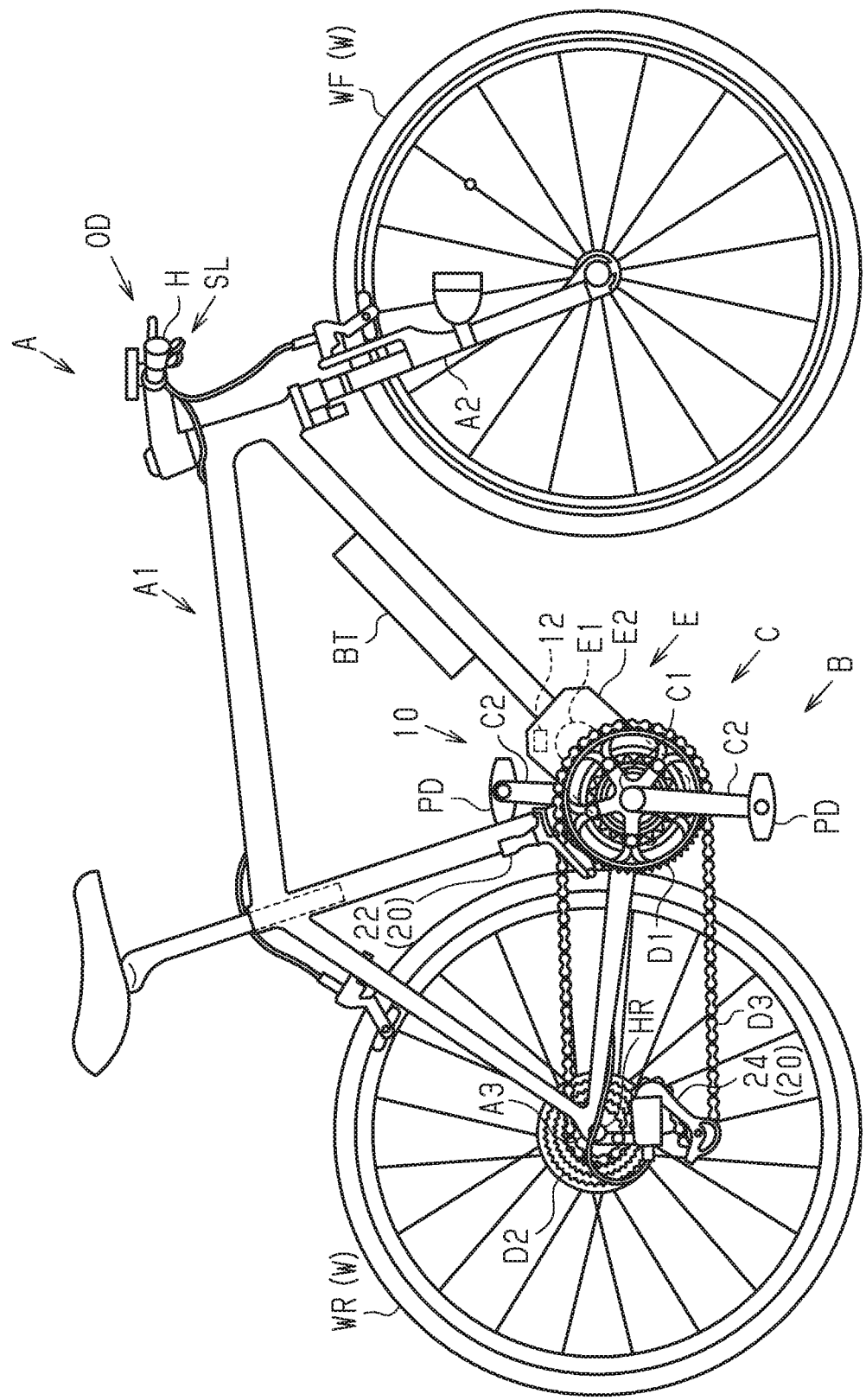
FIG. 1 is a side elevational view of a human-powered vehicle (e.g., a bicycle) including a transmission system in accordance with a first embodiment.

With reference to FIG. 1, a human-powered vehicle A including a transmission system 10 will now be described. The term "human-powered vehicle" refers to a vehicle that at least partially uses human force as a prime mover to travel and includes vehicles that assist human force with electric power. The term "human-powered vehicle" does not include vehicles using only a prime mover that is not human force. In particular, the term "human-powered vehicle" does not include vehicles that use only an internal combustion engine as the prime mover. A typical human-powered vehicle would be a small and light vehicle that can be driven on a public road without the need for a license to drive. The illustrated human-powered vehicle A is a bicycle including an electric assist unit E that uses electric energy to assist human driving force. More specifically, the illustrated human-powered vehicle A is a trekking bike. The human-powered vehicle A further includes a frame A1, a front fork A2, a pair of wheels W, a handlebar H, and a drive train B. The wheels W include a front wheel WF and a rear wheel WR.

The drive train B is of, for example, a chain-drive type. The drive train B includes a crank C, a plurality of front sprockets D1, a plurality of rear sprockets D2, and a chain D3. The crank C includes a crank axle C1, rotatably supported by the frame A1, and two crank arms C2, respectively provided on the two ends of the crank axle C1. A pedal PD is rotatably coupled to the distal end of each crank arm C2. The drive train B can be of any type such as a belt-drive type or a shaft-drive type.

The front sprockets D1 are provided on the crank C so as to rotate integrally with the crank axle C1. The rear sprockets D2 are provided on a hub HR of the rear wheel WR. The chain D3 is wound around a front sprocket D1 and a rear sprocket D2. Human driving force applied to the pedals PD by a rider, who is riding the human-powered vehicle A, is transmitted by the front sprocket D1, the chain D3, and the rear sprocket D2 to the rear wheel WR.

The electric assist unit E is actuated to assist in propulsion of the human-powered vehicle A. The electric assist unit E is actuated in accordance with, for example, the human driving force applied to the pedals PD. The electric assist unit E includes a motor E1. The electric assist unit E is actuated by electric power supplied from a battery BT mounted on the human-powered vehicle A.

The transmission system 10 includes a control device 12 and a transmission 20. The control device 12 is accommodated in, for example, a housing E2 of the electric assist unit E. The control device 12 is actuated by electric power supplied from the battery BT.

The transmission 20 includes an external transmission. In one example, the transmission 20 includes at least one of a front derailleur 22 and a rear derailleur 24. The front derailleur 22 is provided in the vicinity of the front sprockets D1. The front derailleur 22 is driven to change the front sprocket D1 around which the chain D3 is wound and thereby change the transmission ratio of the human-powered vehicle A. The transmission ratio of the human-powered vehicle A is determined by the relationship of the number of teeth of the front sprocket D1 and the number of teeth of the rear sprocket D2. In one example, the transmission ratio of the human-powered vehicle A is determined by the ratio of the rotational speed of the rear sprocket D2 to the rotational speed of the front sprocket D1. That is, the transmission ratio of the human-powered vehicle A is determined by the ratio of the number of teeth of the front sprocket D1 to the number of teeth of the rear sprocket D2. The rear derailleur TR is provided on a rear end A3 of the frame A1. The rear derailleur 24 is driven to change the rear sprocket D2 around which the chain D3 is wound and thereby change the transmission ratio of the human-powered vehicle A. The front sprocket D1 and the rear sprocket D2 can have any structure. There is, for example, one front sprocket D1. In one example, the front sprockets D1 include a front sprocket D1 having 34 teeth. In this case, the structure of the front derailleur 22 can be omitted. There are, for example, eleven rear sprockets D2. In one example, the rear sprockets D2 have 46 teeth, 37 teeth, 32 teeth, 28 teeth, 24 teeth, 21 teeth, 19 teeth, 17 teeth, 15 teeth, 13 teeth, and 11 teeth, respectively. In another example, there are, for example, two front sprockets D1. The front sprockets D1 have 34 teeth and 24 teeth, respectively. Further, there are, for example, twelve rear sprockets D2. The rear sprockets D2 have 51 teeth, 45 teeth, 39 teeth, 33 teeth, 28 teeth, 24 teeth, 21 teeth, 18 teeth, 16 teeth, 14 teeth, 12 teeth, and 10 teeth, respectively. The transmission 20 can include an internal transmission instead of the external transmission. In this case, the internal transmission is provided on, for example, the hub HR of the rear wheel WR. The transmission 20 can include a continuously variable transmission instead of the external transmission. In this case, the continuously variable transmission is provided on, for example, the hub HR of the rear wheel WR. The transmission 20 changes the transmission ratio of the human-powered vehicle A in accordance with an operation signal from a transmission operating device SL.

Figure 2:
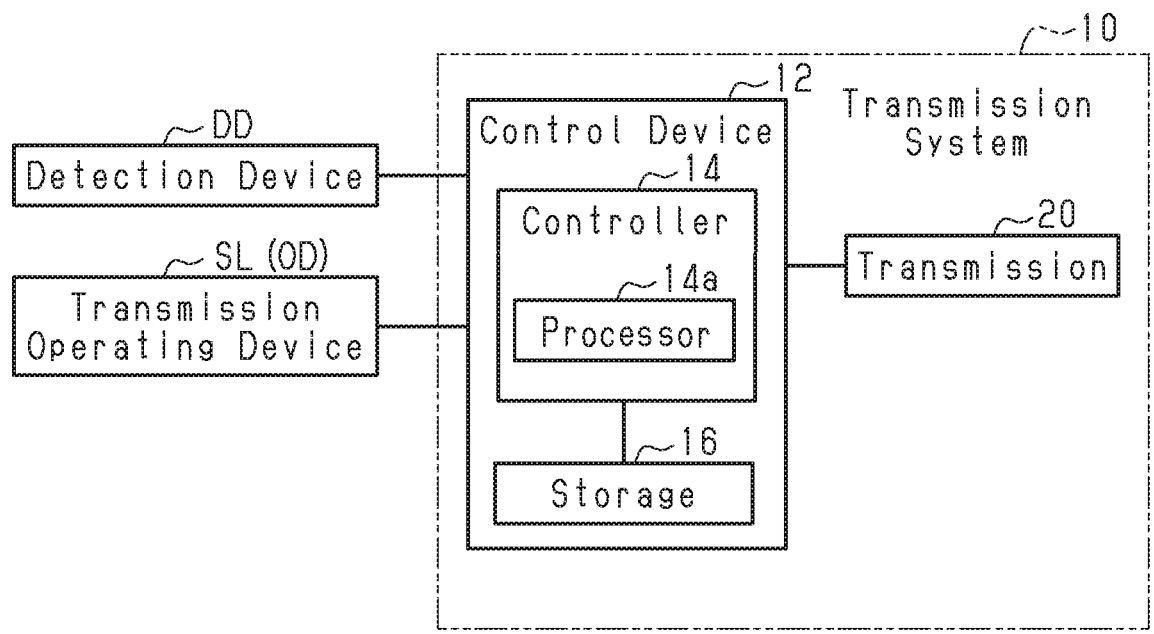
FIG. 2 is a block diagram showing the electrical connection of the control device in accordance with the first embodiment and various elements.

With reference to FIG. 2, the configuration of the transmission system 10 will now be described in detail. The control device 12 includes an electronic controller 14 that is configured to control a component that is mounted on the human-powered vehicle A. The component of the human-powered vehicle A includes at least the transmission 20. In one example, the electronic controller 14 controls the transmission 20 to shift the transmission ratio of the human-powered vehicle A in accordance with traveling information of the human-powered vehicle A. In one example, the electronic controller 14 controls the transmission 20 in accordance with a predetermined shifting condition that includes the traveling information of the human-powered vehicle A. In one example, the predetermined shifting condition includes at least one of a first shifting condition and a second shifting condition. In one example, the first shifting condition is used to determine whether or not to shift the transmission ratio of the human-powered vehicle A. Further, the second shifting condition is used to determine whether or not to restrict shifting of the transmission ratio of the human-powered vehicle A. Restriction of shifting of the transmission ratio includes at least one of restriction of shifting of the transmission ratio determined with the first shifting condition and restriction of shifting of the transmission stage determined with the first shifting condition. In one example, the first shifting condition is set based on a first reference value. The second shifting condition is set based on a second reference value. The second reference value differs from the first reference value.

The control device 12 includes the electronic controller 14 that is configured to control the transmission 20 to shift the transmission ratio of the human-powered vehicle A in accordance with the first shifting condition set based on the first reference value. The electronic controller 14 includes at least one of a central processing unit (CPU) and a micro-processing unit (MPU) that includes at least one processor 14a that executes predetermined control programs. The electronic controller 14 controls the transmission 20 in accordance with an operation performed on the transmission operating device SL. The term "electronic controller" as used herein refers to hardware that executes a software program, and does not include a human. The control device 12 further includes storage 16 that stores various types of information, control programs and control processes. The storage 16 includes any computer storage device or any non-transitory computer-readable medium with the sole exception of a transitory, propagating signal. For example, the storage 64 includes a nonvolatile memory and a volatile memory. A non-volatile memory includes, for example, at least one of a read-only memory (ROM), an erasable programmable read-only memory (EPROM), an electrically erasable programmable read-only memory (EEPROM), and a flash memory. A volatile memory includes, for example, a random access memory (RAM). The storage 16 stores, for example, various types of programs used for control and various types of preset information or the like.

The human-powered vehicle A includes an operating device OD that accepts external inputs. The operating device OD includes at least the transmission operating device SL. The transmission 20 is configured to be, for example, mechanically or electrically driven in accordance with an operation performed on the transmission operating device SL. In a case where the transmission 20 is electrically driven, the transmission 20 is actuated by electric power supplied from the battery BT or electric power supplied from a dedicated power supply mounted on the transmission 20. The transmission operating device SL is configured to shift the transmission stage. Transmission stages are set in correspondence with transmission ratios. In a case where the transmission operating device SL is operated, the transmission 20 is actuated to shift the transmission stage and the transmission ratio of the human-powered vehicle A. In one example, in a case where the transmission operating device SL is operated, the transmission 20 is actuated to decrease the transmission ratio of the human-powered vehicle A. In another example, in a case where the transmission operating device SL is operated, the transmission 20 is actuated to increase the transmission ratio of the human-powered vehicle A. The transmission operating device SL is connected to the electronic controller 14 in a manner allowing for wired communication or wireless communication. In the description hereafter, shifting performed by the transmission 20 to decrease the transmission ratio of the human-powered vehicle A will be referred to as first shifting, and shifting performed by the transmission 20 to increase the transmission ratio of the human-powered vehicle A will be referred to as second shifting. First shifting is equivalent to a shift-down to a lower transmission stage. Second shifting is equivalent to a shift-up to a higher transmission stage.

The human-powered vehicle A further includes a detection device DD that detects various types of information. In one example, the detection device DD detects the traveling information of the human-powered vehicle A. The traveling information of the human-powered vehicle A includes at least one of the first reference value and the second reference value. The first reference value includes at least one of cadence, torque acting on the crank C of the human-powered vehicle A, power, and vehicle speed of the human-powered vehicle A. Cadence is the number of revolutions per unit time of the crank C. Power is the product of cadence and torque. The second reference value includes at least one of a reference value indicating an acceleration tendency of the human-powered vehicle A and a reference value indicating a deceleration tendency of the human-powered vehicle A. In one example, the reference value indicating the acceleration tendency of the human-powered vehicle A includes acceleration of the human-powered vehicle A. In one example, the reference value indicating the deceleration tendency of the human-powered vehicle A includes deceleration of the human-powered vehicle A. The acceleration of the human-powered vehicle A and the deceleration of the human-powered vehicle A includes at least one of an amount of change in vehicle speed per unit time and an amount of change in kinetic energy that is a square function of vehicle speed. The detection device DD includes at least one of a sensor that detects cadence from the number of revolutions per unit time of the crank C, a sensor that detects the torque acting on the crank C of the human-powered vehicle A, a sensor that detects power, a sensor that detects the vehicle speed of the human-powered vehicle A, a sensor that detects the acceleration of the human-powered vehicle A, and a sensor that detects the deceleration of the human-powered vehicle A. The detection device DD can be configured to detect the present transmission ratio of the human-powered vehicle A. The detection device DD can be configured to detect at least one of traveling environment information related to the environment in which the human-powered vehicle A is traveling and rider information related to the rider of the human-powered vehicle A. In one example, the detection device DD is configured to detect at least one of the traveling environment information and the rider information. In another example, the detection device DD includes a communication unit allowing for at least one of the traveling environment information and the rider information to be received from an external device. The electronic controller 14 obtains various types of information detected by the detection device DD through wired communication or wireless communication. The traveling environment information includes at least one of road surface information related to the state of a road surface, air resistance information related to the air resistance, weather information related to the weather, and temperature information related to the temperature. The road surface information, which is related to the state of the road surface, includes information related to the gradient of the road surface. The rider information includes at least one of heart rate, myopotential, perspiration amount, and body temperature of the rider.

In a case where the first shifting condition is satisfied, the electronic controller 14 changes a target transmission ratio related to the transmission ratio of the human-powered vehicle A. The electronic controller 14 executes shifting control to control the transmission 20 so that the transmission ratio of the human-powered vehicle A matches the changed target transmission ratio. In a case where the target transmission ratio is changed, the difference between the transmission stage corresponding to the target transmission ratio prior to the change and the transmission stage corresponding to the target transmission ratio subsequent to the change is either one stage or two or more stages. The first shifting condition includes a first threshold value TH1 and a second threshold value TH2 that is smaller than the first threshold value TH1. In a case where the first reference value is greater than or equal to the first threshold value TH1, the electronic controller 14 executes second shifting that increases the transmission ratio of the human-powered vehicle A. In a case where the first reference value is less than or equal to the second threshold value TH2, the electronic controller 14 executes first shifting that decreases the transmission ratio of the human-powered vehicle A.

Figure 3:
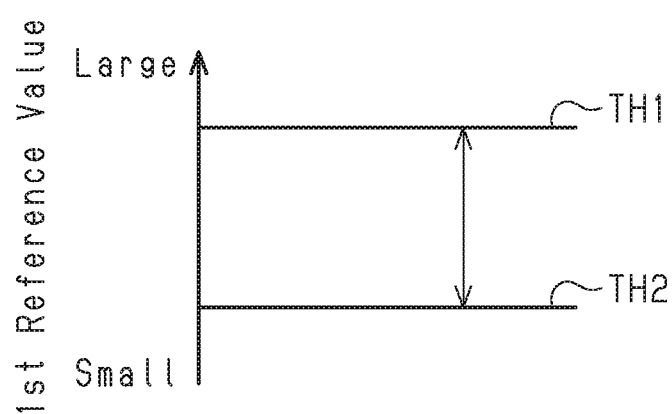
FIG. 3 is a map showing one example of a first shifting condition used by the control device in accordance with the first embodiment to execute control on a transmission.

FIG. 3 shows the relationship of the first reference value and the first threshold value TH1 and the relationship of the first reference value and the second threshold value TH2. The electronic controller 14 obtains the first reference value from the detection device DD mounted on the human-powered vehicle A. One example of the first reference value is cadence. The electronic controller 14 controls the transmission 20 to perform second shifting in accordance with the relationship of the first reference value and the first threshold value TH1. The electronic controller 14 controls the transmission 20 to perform first shifting in accordance with the relationship of the first reference value and the second threshold value TH2. The first threshold value TH1 and the second threshold value TH2 set a predetermined range related to the first reference value. The first threshold value TH1 sets the upper limit of the predetermined range. The second threshold value TH2 sets the lower limit of the predetermined range. The predetermined range is greater than the second threshold value TH2 and less than the first threshold value TH1. In one example, first shifting and second shifting are not performed in a case where the first reference value is included in the predetermined range. The electronic controller 14 controls the transmission 20 to perform second shifting in a case where the first reference value is greater than or equal to the first threshold value TH1. The electronic controller 14 controls the transmission 20 to perform first shifting in a case where the first reference value is less than or equal to the second threshold value TH2. The electronic controller 14 controls the transmission 20 to maintain the transmission ratio of the human-powered vehicle A in a case where the first reference value is greater than or equal to the first threshold value TH1 and the present transmission ratio of the human-powered vehicle A is the maximum transmission ratio. The maximum transmission ratio of the human-powered vehicle A is based on the relationship of the front sprocket D1 and the rear sprocket D2. The electronic controller 14 controls the transmission 20 to maintain the transmission ratio of the human-powered vehicle A in a case where the first reference value is less than or equal to the second threshold value TH2 and the present transmission ratio of the human-powered vehicle A is the minimum transmission ratio. The minimum transmission ratio of the human-powered vehicle A is based on the relationship of the front sprocket D1 and the rear sprocket D2. The first threshold value TH1 and the second threshold value TH2 can be set to any value. In a first example, the first threshold value TH1 is 80 rpm. The second threshold value TH2 is 60 rpm. The predetermined range is 20 rpm. In a second example, the first threshold value TH1 is 85 rpm. The second threshold value TH2 is 55 rpm. The predetermined range is 30 rpm.

The electronic controller 14 controls the transmission 20 to restrict shifting of the transmission ratio of the human-powered vehicle A regardless of the first shifting condition in a case satisfying the second shifting condition set based on the second reference value. Restriction of shifting of the transmission ratio of the human-powered vehicle A regardless of the first shifting condition includes restricting shifting of the transmission ratio without referring to whether or not the first shifting condition is satisfied and restricting shifting of the transmission ratio even if the first shifting condition is satisfied. The electronic controller 14 executes shifting restriction control to control the transmission 20 so as to restrict shifting of the transmission ratio of the human-powered vehicle A. The electronic controller 14 executes shifting restriction control in accordance with the traveling information of the human-powered vehicle A. In the shifting restriction control, the transmission 20 is controlled so that the transmission ratio of the human-powered vehicle A does not shift from the transmission ratio at a predetermined point of time, the transmission ratio at the predetermined point of time does not approach the target transmission ratio, or the transmission ratio at the predetermined point of time does not match the target transmission ratio. In one example, the predetermined point of time is the point of time at which it is determined that the second shifting condition is satisfied.

In the shifting control, the electronic controller 14 controls the transmission 20 to shift the transmission ratio of the human-powered vehicle A in accordance with first information related to the human-powered vehicle A. In the shifting restriction control, the electronic controller 14 controls the transmission 20 to restrict shifting of the transmission ratio of the human-powered vehicle A in accordance with second information related to the human-powered vehicle A. The second information differs from the first information.

The first information includes, for example, at least one of operating information related to operation of the transmission operating device SL and first travel information related to traveling of the human-powered vehicle A. The first travel information includes, for example, at least one of the first reference value and the rider information. The first reference value includes, for example, cadence. The second information includes, for example, second travel information related to traveling of the human-powered vehicle A. The second travel information includes, for example, at least one of the second reference value and the traveling environment information. The second reference value includes, for example, at least one of acceleration of the human-powered vehicle A and deceleration of the human-powered vehicle A. The first reference value can have a characteristic in which it reflects the load on the rider in a relatively stronger manner than, for example, the second reference value. The second reference value can have a characteristic in which it reflects behavior of the human-powered vehicle A that is not intended by the rider in a relatively stronger manner than, for example, the first reference value.

In the shifting control, the electronic controller 14 controls the transmission 20 in accordance with at least one of the operating information and the first travel information. The operating information includes designating information that designates a transmission stage. The designation information includes information related to the number of shifted transmission stages (hereinafter referred to as "the shift stage number") and the direction in which the transmission stage is shifted (hereinafter referred to as "the shift direction"). The shift stage number is either one stage or two or more stages. The shift direction is upward or downward. The shift stage number and the shift direction determine the target shift stage.

Shift control that is based on the operating information will now be described. The electronic controller 14 obtains the operating information from the transmission operating device SL. The electronic controller 14 controls the transmission 20 so that the actual transmission stage matches the target transmission stage in a case where the actual transmission stage differs from the target transmission stage determined by the operating information. The electronic controller 14 controls the transmission 20 to maintain the transmission stage in a case where the actual transmission stage matches the target transmission stage.

Shift control that is based on the first information instead of or in addition to the operating information will now be described. The electronic controller 14 obtains the first travel information from the detection device DD. The electronic controller 14 is configured to determine whether or not the first shifting condition is satisfied based on the first reference value included in the first travel information. In a case where the first shifting condition is satisfied, the electronic controller 14 controls the transmission 20 based on a shifting execution condition. The shifting execution condition includes a plurality of shifting execution conditions. In one example, the shifting execution conditions include first to fourth shifting execution conditions. The first shifting execution condition is for determining the target transmission stage so that the transmission stage is shifted by one stage in the upward direction. The second shifting execution condition is for determining the target transmission stage so that the transmission stage is shifted by one stage in the downward direction. The third shifting execution condition is for determining the target transmission stage so that the transmission stage is shifted by two or more stages in the upward direction. The fourth shifting execution condition is for determining the target transmission stage so that the transmission stage is shifted by two or more stages in the downward direction. In one example, the first shifting execution condition is satisfied in a case where the first reference value is greater than or equal to the first threshold value. The second shifting execution condition is satisfied in a case where the first reference value is less than or equal to the second threshold value. The third shifting execution condition is satisfied in a case where the first reference value is greater than or equal to the first threshold value and operating information is obtained from the transmission operating device SL. The fourth shifting execution condition is satisfied in a case where the first reference value is less than or equal to the second threshold value and operating information is obtained from the transmission operating device SL. The electronic controller 14 executes first shifting as a result of the second shifting execution condition and the fourth shifting execution condition. The electronic controller 14 executes second shifting as a result of the first shifting execution condition and the third shifting execution condition.

In a case where one of the shifting execution conditions is satisfied, the electronic controller 14 sets the target transmission stage that is determined from the satisfied shifting execution condition as a temporary target transmission stage. The electronic controller 14 sets a final target transmission stage in accordance with the relationship of the temporary target transmission stage and a shift restriction request set by the shifting restriction control. In a case where the shift restriction request is not set, the electronic controller 14 sets the temporary target transmission stage as the final target transmission stage. In a case where the actual transmission stage differs from the final target transmission stage, the electronic controller 14 controls the transmission 20 so that the actual transmission stage matches the final target transmission stage. In a case where the actual transmission stage matches the target transmission stage, the electronic controller 14 controls the transmission 20 so as to maintain the transmission stage.

Shift control that is based on the travel information will now be described. The electronic controller 14 refers to the second reference value as the travel information. The second reference value differs from the first reference value. In one example, the second reference value includes deceleration of the human-powered vehicle A. In a case where deceleration of the human-powered vehicle A is greater than or equal to a second predetermined value, the electronic controller 14 is configured to determine that the second shifting condition is satisfied and restricts shifting of the transmission ratio of the human-powered vehicle A. More specifically, in a case where the deceleration of the human-powered vehicle A is greater than or equal to the second predetermined value, the electronic controller 14 is configured to determine that the second shifting condition is satisfied and restricts second shifting that increases the transmission ratio of the human-powered vehicle A. In another example, the second reference value includes acceleration of the human-powered vehicle A. In a case where the acceleration of the human-powered vehicle A is greater than or equal to a first predetermined value, the electronic controller 14 is configured to determine that the second shifting condition is satisfied and restricts shifting of the transmission ratio of the human-powered vehicle A. More specifically, in a case where the acceleration of the human-powered vehicle A is greater than or equal to the first predetermined value, the electronic controller 14 is configured to determine that the second shifting condition is satisfied and restricts first shifting that decreases the transmission ratio of the human-powered vehicle A. Any value can be set as the first predetermined value and the second predetermined value. In one example, the first predetermined value is greater than 0 m/s². The second predetermined value is greater than 0 m/s².

In a case where the second shifting condition is satisfied, the electronic controller 14 controls the transmission 20 based on an execution restriction condition. The execution restriction condition includes a plurality of execution restriction conditions. In one example, the execution restriction conditions include first to sixth execution restriction conditions. The first execution restriction condition sets a shift restriction request that prohibits shifting of the transmission stage. The second execution restriction condition sets a shift restriction request that designates the present transmission stage as the final target transmission stage. The third execution restriction condition sets a shift restriction request that designates the final target transmission stage so that the absolute value of the difference between the final target transmission stage and the present transmission stage is smaller than the difference between the temporary target transmission stage and the present transmission stage. The fourth execution restriction condition sets a shift restriction request that skips a process for determining whether or not the first shifting condition is satisfied in the shifting control. The fifth execution restriction condition sets a shift restriction request that invalidates a determination result of whether or not the first shifting condition is satisfied in the shifting control. The sixth execution restriction condition sets a shift restriction request that widens the predetermined range set by the first threshold value and the second threshold value. The predetermined range is widened by at least one of a process for increasing the first threshold value and a process for decreasing the second threshold value.

In a case where the second shifting condition is satisfied, the electronic controller 14 sets a shift restriction request corresponding to at least one of the first to sixth execution restriction conditions. In a case where the first shifting condition is satisfied in the shifting control, the electronic controller 14 sets the shift restriction request corresponding to one or more of the first to sixth execution restriction conditions. In a case where the first shifting condition is not satisfied in the shifting control, the electronic controller 14 sets the shift restriction request corresponding to one or more of the first to sixth execution restriction conditions.

In a case where the first shifting is satisfied and a transmission restriction request is set, the electronic controller 14 sets the final target transmission stage in accordance with the shift restriction request. The temporary target transmission stage is cleared and not set as the final target transmission stage.

In a case where the first shifting condition is not satisfied and a transmission restriction request is set, the electronic controller 14 sets the final target transmission stage in accordance with the shift restriction request until a cancellation request is satisfied. The cancellation condition is determined in accordance with one or more of time, the first travel information, and the second travel information. In a first example, the cancellation condition is in that a predetermined time has elapsed from a point of time at which the second shifting condition was satisfied. In a second example, the cancellation condition is in that a rotational angle of the crank C from a point of time at which the second shifting condition was satisfied has exceeded a predetermined rotational angle. In a third example, the cancellation condition is in that the travelled distance of the human-powered vehicle A from a point of time at which the second shifting condition was satisfied has exceeded a predetermined traveled distance. In a fourth example, the cancellation condition is in that a decrease amount of the acceleration included in the second reference value has exceeded a certain amount. In a fifth example, the cancellation condition is in that a decrease amount of the deceleration included in the second reference value has exceeded a certain amount. The electronic controller 14 does not shift the transmission stage in a state in which the second shifting condition is satisfied, the shifting restriction request is set, and the cancellation condition is not satisfied. The electronic controller 14 clears the shifting restriction request in a case where the cancellation condition is satisfied.

Figure 4:
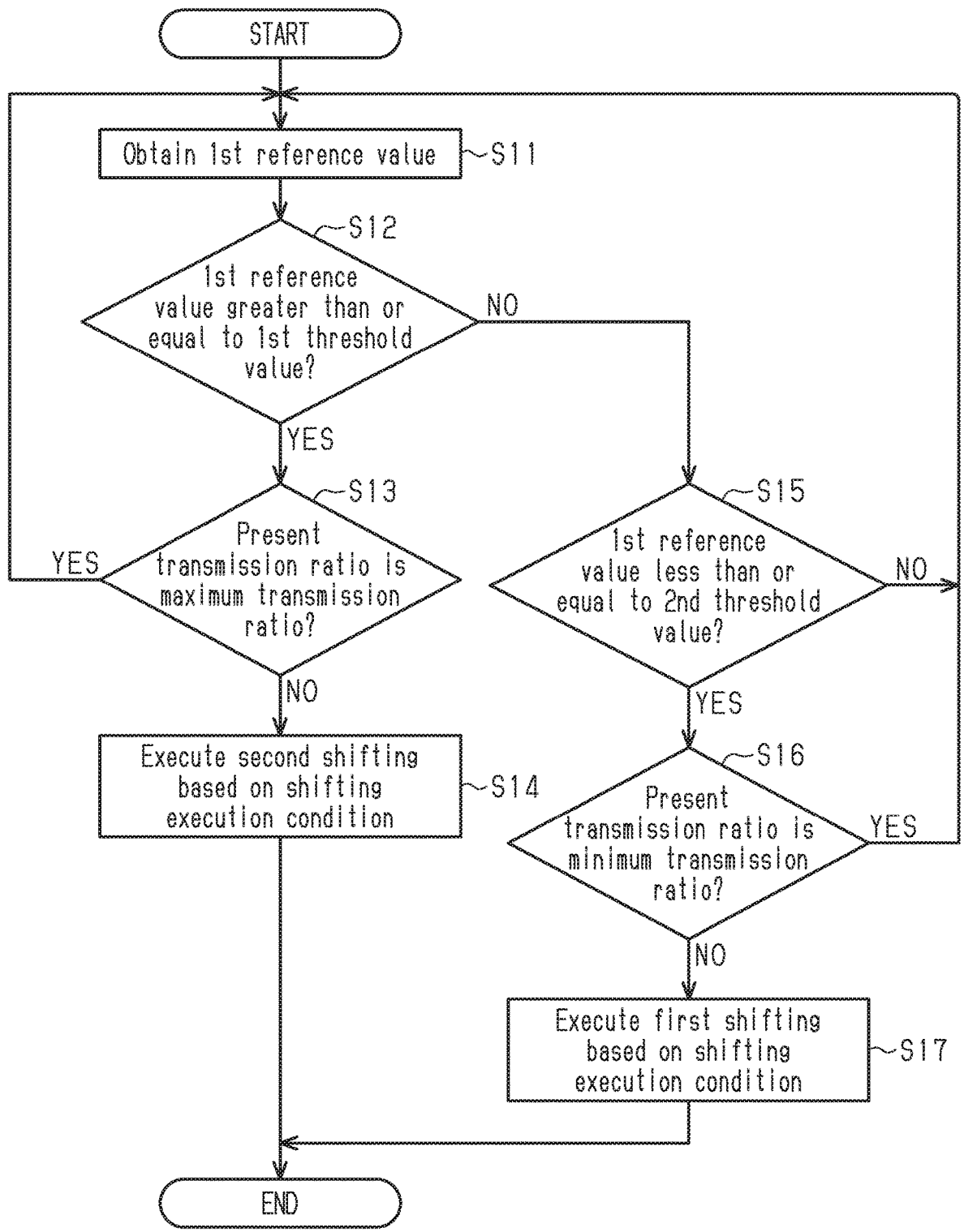
FIG. 4 is a flowchart showing one example of a first transmission control executed by the control device in accordance with the first embodiment.

With reference to FIG. 4, one example of the shifting control executed by the control device 12 will now be described. The shifting control in accordance with the first embodiment is also referred to as the first shifting control. In the first shifting control, the electronic controller 14 executes first shifting and second shifting based on the first reference value that is the operating information and the first travel information.

The electronic controller 14 executes the first shifting control through, for example, the process described below. In step S11, the electronic controller 14 obtains the first reference value. More specifically, the electronic controller 14 obtains the first reference value from the detection device DD.

In step S12, the electronic controller 14 determines whether or not the first reference value is greater than or equal to the first threshold value TH1. In a case where the electronic controller 14 determines that the first reference value is greater than or equal to the first threshold value TH1, the electronic controller 14 proceeds to step S13. In a case where the electronic controller 14 determines that the first reference value is not greater than or equal to the first threshold value TH1, the electronic controller 14 proceeds to step S15.

In step S13, the electronic controller 14 determines whether the present transmission ratio of the human-powered vehicle A is the maximum transmission ratio. In a case where the electronic controller 14 determines that the present transmission ratio of the human-powered vehicle A is the maximum transmission ratio, the electronic controller 14 proceeds to step S11. In a case where the electronic controller 14 determines that the present transmission ratio of the human-powered vehicle A is not the maximum transmission ratio, the electronic controller 14 proceeds to step S14.

In step S14, the electronic controller 14 executes second shifting based on the shifting execution condition to increase the transmission ratio of the human-powered vehicle A. Upon completion of step S14, the electronic controller 14 ends the control.

In step S15, the electronic controller 14 determines whether or not the first reference value is less than or equal to the second threshold value TH2. In a case where the electronic controller 14 determines that the first reference value is less than or equal to the second threshold value TH2, the electronic controller 14 proceeds to step S16. In a case where the electronic controller 14 determines that the first reference value is not less than or equal to the second threshold value TH2, the electronic controller 14 proceeds to step S11.

In step S16, the electronic controller 14 determines whether or not the present transmission ratio of the human-powered vehicle A is the minimum transmission ratio. In a case where the electronic controller 14 determines that the present transmission ratio of the human-powered vehicle A is the minimum transmission ratio, the electronic controller 14 proceeds to step S11. In a case where the electronic controller 14 determines that the present transmission ratio of the human-powered vehicle A is not the minimum transmission ratio, the electronic controller 14 proceeds to step S17.

In step S17, the electronic controller 14 executes first shifting based on the shifting execution condition to decrease the transmission ratio of the human-powered vehicle A. Upon completion of step S17, the electronic controller 14 ends the control. The electronic controller 14 repetitively executes the first shifting control including the process from steps S11 to S17 while, for example, the human-powered vehicle A is traveling.

Figure 5:
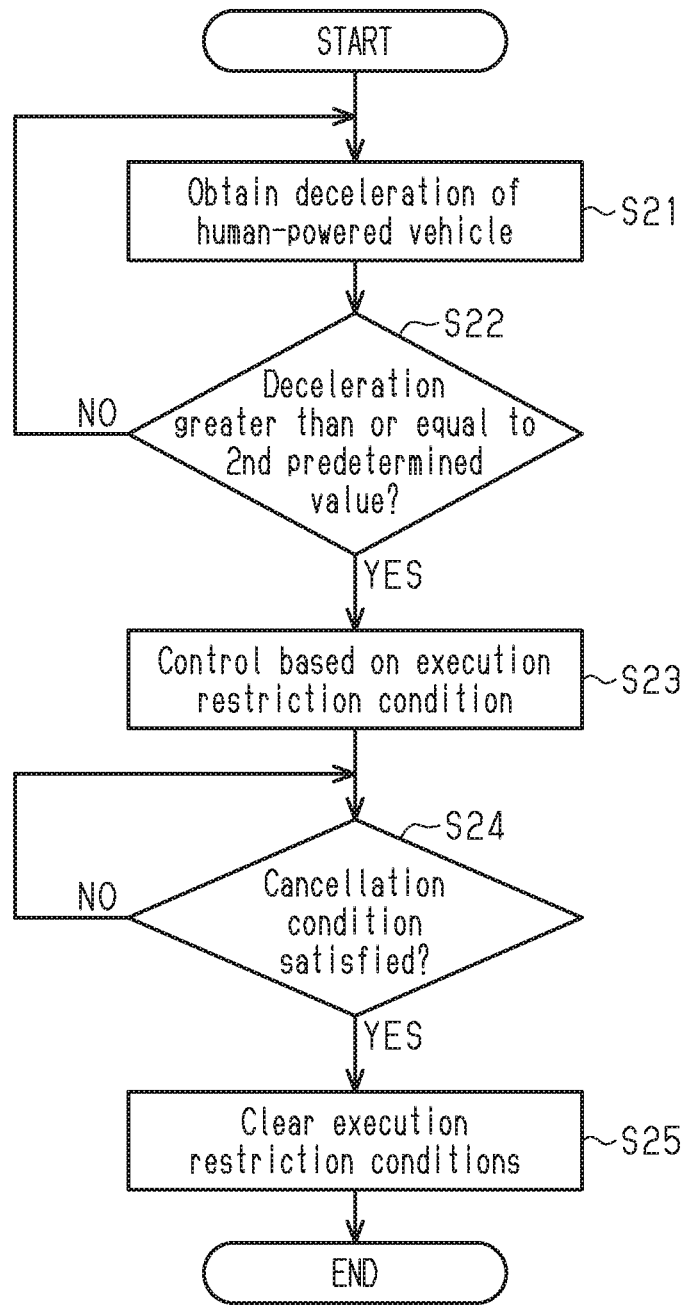
FIG. 5 is a flowchart showing one example of a first transmission restriction control executed by the control device in accordance with the first embodiment.

With reference to FIG. 5, one example of the shifting restriction control executed by the electronic controller 14 based on the second shifting condition will now be described. Hereinafter, the shifting restriction control in accordance with the first embodiment is also referred to as the first shifting restriction control. The first shifting restriction control is executed by the electronic controller 14 to restrict second shifting and cancel restriction of second shifting based on the deceleration of the human-powered vehicle A, which is the second reference value. The electronic controller 14 executes the first shifting restriction control in parallel with the first shifting control.

The electronic controller 14 executes the first shifting restriction control through, for example, the process described below.

In step S21, the electronic controller 14 obtains the deceleration of the human-powered vehicle A. In step S22, the electronic controller 14 determines whether or not the deceleration is greater than or equal to the second predetermined value. In a case where the electronic controller 14 determines that the deceleration is greater than or equal to the second predetermined value, the electronic controller 14 proceeds to step S23. In a case where the electronic controller 14 determines that the deceleration is not greater than or equal to the second predetermined value, the electronic controller 14 proceeds to step S21.

In step S23, the electronic controller 14 determines that the second shifting condition has been satisfied and restricts second shifting that increases the transmission ratio of the human-powered vehicle A. More specifically, the electronic controller 14 sets at least one of the execution restriction conditions. In step S24, the electronic controller 14 determines whether or not the cancellation condition is satisfied. In a case where the electronic controller 14 determines that the cancellation condition has been satisfied, the electronic controller 14 proceeds to step S25. In a case where the electronic controller 14 determines that the cancellation condition has not been satisfied, the electronic controller 14 executes step S24 again.

In step S25, the electronic controller 14 clears all of the execution restriction conditions. The electronic controller 14 executes second shifting in accordance with whether or not the first shifting condition has been satisfied. The electronic controller 14 repetitively executes the first shifting restriction control including the process from steps S21 to S25 while, for example, the human-powered vehicle A is traveling. In a case where the execution restriction conditions are set by the first shifting restriction control, the electronic controller 14 does not execute second shifting in the first shifting control.

Second Embodiment

Figure 6:
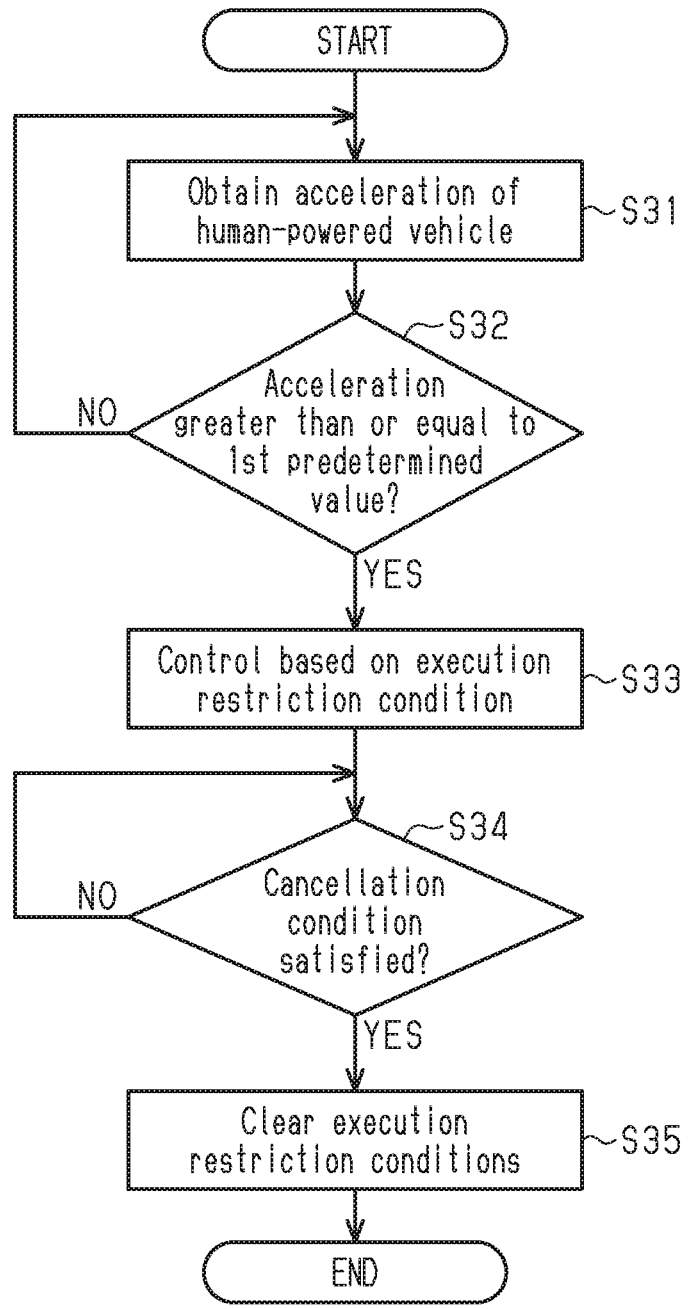
FIG. 6 is a flowchart showing one example of a second transmission restriction control executed by a control device in accordance with a second embodiment.

With reference to FIG. 6, a transmission system 10 in accordance with a second embodiment will now be described. In the transmission system 10 in accordance with the second embodiment, the electronic controller 14 executes shifting restriction control based on the acceleration of the human-powered vehicle A, which is the second reference value, and the first predetermined value. The shifting restriction control in accordance with the second embodiment is also referred to as the second shifting restriction control. In the description hereafter, same reference numerals are given to those components that are the same as the corresponding components of the first embodiment. Such components will not be described in detail.

The control device 12 executes the second shifting restriction control instead of or in addition to the first shifting restriction control. The second shifting restriction control is a control executed by the electronic controller 14 to restrict first shifting and cancel restriction of first shifting based on the second reference value.

In step S31, the electronic controller 14 obtains the acceleration of the human-powered vehicle A. In step S32, the electronic controller 14 determines whether or not the acceleration is greater than or equal to the first predetermined value. In a case where the electronic controller 14 determines that the acceleration is greater than or equal to the first predetermined value, the electronic controller 14 proceeds to step S33. In a case where the electronic controller 14 determines that the acceleration is not greater than or equal to the first predetermined value, the electronic controller 14 proceeds to step S31.

In step S33, the electronic controller 14 determines that the second shifting condition has been satisfied and restricts first shifting that decreases the transmission ratio of the human-powered vehicle A. More specifically, the electronic controller 14 sets at least one of the execution restriction conditions. In step S34, the electronic controller 14 determines whether or not the cancellation condition is satisfied. In a case where the electronic controller 14 determines that the cancellation condition has been satisfied, the electronic controller 14 proceeds to step S35. In a case where the electronic controller 14 determines that the cancellation condition has not been satisfied, the electronic controller 14 executes step S34 again.

In step S35, the electronic controller 14 clears all of the execution restriction conditions. The electronic controller 14 executes first shifting in accordance with whether or not the first shifting condition has been satisfied. The electronic controller 14 repetitively executes the second shifting restriction control including the process from steps S31 to S35 while, for example, the human-powered vehicle A is traveling. In a case where the execution restriction conditions are set by the second shifting restriction control, the electronic controller 14 does not execute first shifting in the first shifting control.

Third Embodiment

Figure 7:
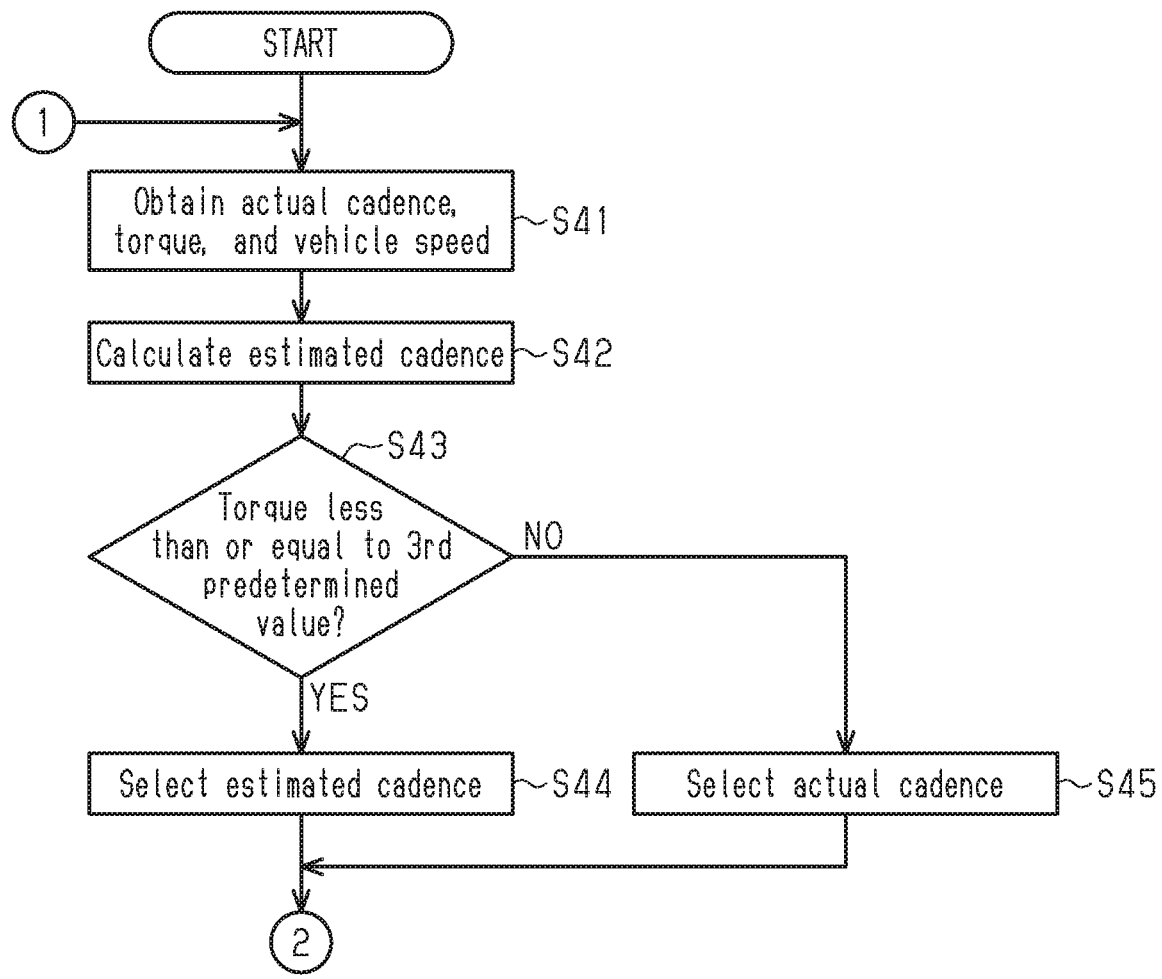
FIG. 7 is a flowchart showing one example of a second transmission control executed by the control device in accordance with a third embodiment.
Figure 8:
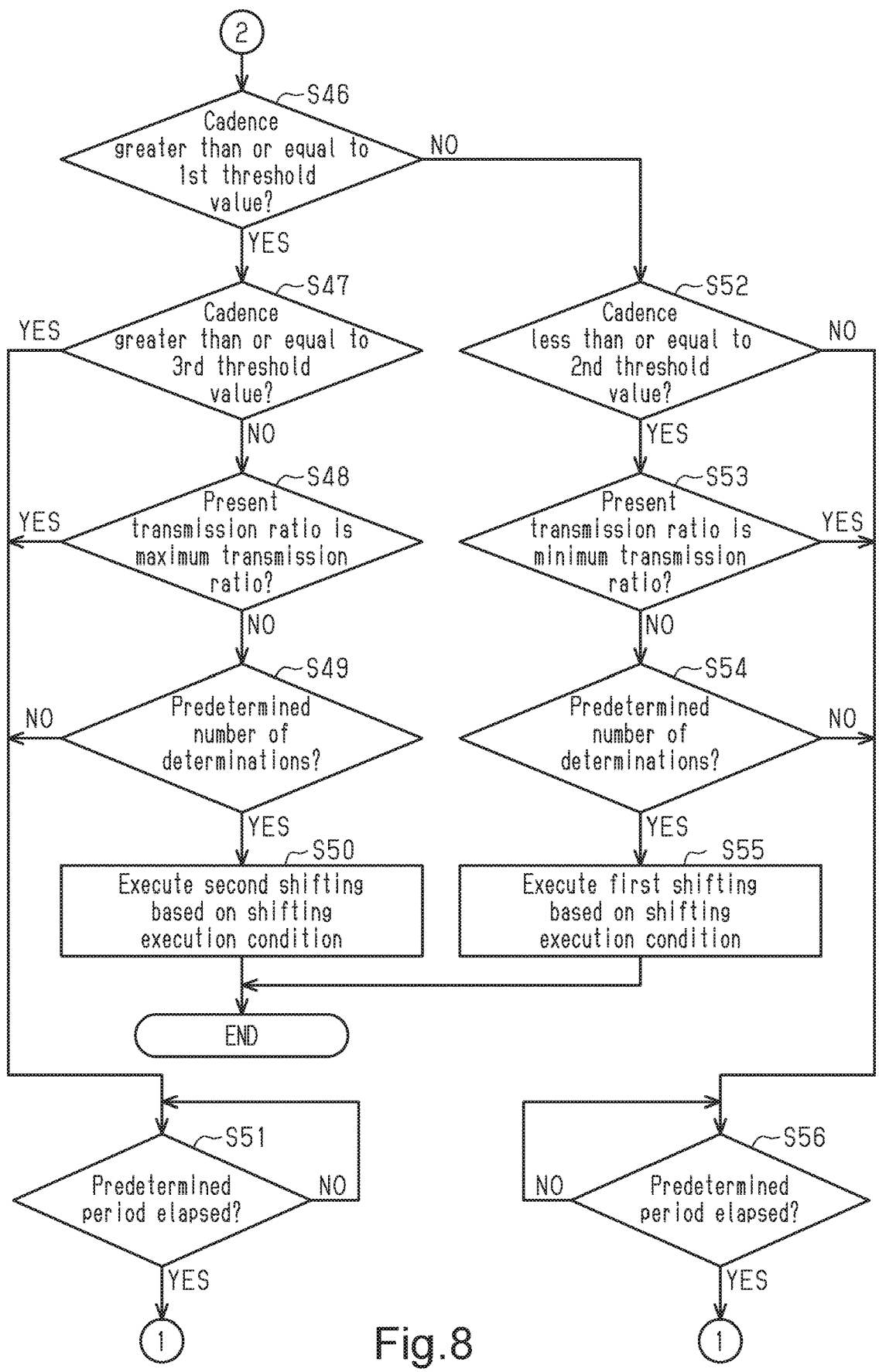
FIG. 8 is a flowchart showing one example of the second transmission control executed by the control device in accordance with the third embodiment.

With reference to FIGS. 7 and 8, a transmission system 10 in accordance with a third embodiment will now be described. The transmission system 10 in accordance with the third embodiment differs from the transmission system 10 in accordance with the first embodiment and the second embodiment in that the transmission system 10 in accordance with the third embodiment refers to the torque and the vehicle speed and also to a third threshold value that is greater than the first threshold value. The shifting control in accordance with the third embodiment is also referred to as the second shifting control. In the description hereafter, same reference numerals are given to those components that are the same as the corresponding components of the transmission system 10 in accordance with each of the first embodiment and the second embodiment. Such components will not be described in detail.

The control device 12 executes the second shifting control instead of or in addition to the first shifting control. In the second shifting control, the electronic controller 14 executes at least one of first shifting and second shifting based on the first reference value.

In the second shifting control, the first reference value includes cadence. The electronic controller 14 restricts second shifting that increases the transmission ratio of the human-powered vehicle A in a case where the cadence is greater than or equal to the third threshold value, which is greater than the first threshold value. The third threshold value is set to a value that is greater than the value of the cadence usually output by the rider. The third threshold value is greater by an amount corresponding to a predetermined value than the first threshold value TH1. In one example, the predetermined value is larger than 30 rpm. In one example, the predetermined value is 120 rpm. The third threshold value is 200 rpm.

In the second shifting control, the first reference value includes vehicle speed. The electronic controller 14 calculates an estimated cadence of the human-powered vehicle A from the vehicle speed. The electronic controller 14 calculates the estimated cadence from the relationship of the present vehicle speed of the human-powered vehicle A and the transmission ratio of the human-powered vehicle A. In the description hereafter, the cadence that is directly detected from the number of revolutions per unit time of the crank C can be referred to as the actual cadence. The first reference value further includes cadence and torque, which acts on the crank C of the human-powered vehicle A. The electronic controller 14 determines whether or not the first shifting condition is satisfied based on the estimated cadence in a case where the torque is less than or equal to a third predetermined value. The third predetermined value is set to a value indicating that the rider has no intention to positively depress the pedals PD of the human-powered vehicle A. In one example, the third predetermined value is smaller than 15 Nm. The electronic controller 14 determines whether or not the first shifting condition is satisfied based on the actual cadence in a case where the torque is greater than the third predetermined value.

In the second shifting control, the electronic controller 14 determines whether or not the first shifting condition is satisfied every predetermined period and shifts the transmission ratio of the human-powered vehicle A in a case where the first shifting condition is satisfied a predetermined number of times. In one example, the electronic controller 14 determines whether or not the first shifting condition for performing first shifting is satisfied every predetermined period and performs first shifting in a case where the first shifting condition is satisfied a predetermined number of times. In another example, the electronic controller 14 determines whether or not the first shifting condition for performing second shifting is satisfied every predetermined period and performs second shifting in a case where the first shifting condition is satisfied a predetermined number of times. The predetermined period can be set to any period. In one example, the predetermined period is set by rotation of the crank C of the human-powered vehicle A. In one example, the predetermined period is set by a rotational angle of the crank C of the human-powered vehicle A. In one example, the predetermined period is greater than 0 degrees and less than 360 degrees. In one example, the predetermined period is 180 degrees. More specifically, the predetermined period is set to a period during which the crank C of the human-powered vehicle A is rotated by a predetermined angle. One example of the predetermined angle is 180 degrees. The predetermined number of times is set to any number that is two or greater. In one example, the predetermined number of times is three.

The electronic controller 14 executes the second shifting control through, for example, the process described below.

In step S41, the electronic controller 14 obtains the first reference value. The first reference value includes actual cadence, torque, and vehicle speed of the human-powered vehicle A. In step S42, the electronic controller 14 calculates an estimated cadence from the torque and vehicle speed of the human-powered vehicle A.

In step S43, the electronic controller 14 determines whether or not the torque is less than or equal to the third predetermined value. In a case where the electronic controller 14 determines that the torque is less than or equal to the third predetermined value, the electronic controller 14 proceeds to step S44. In a case where the electronic controller 14 determines that the torque is not less than or equal to the third predetermined value, the electronic controller 14 proceeds to step S45.

In step S44, the electronic controller 14 selects the estimated cadence as the first reference value to determine whether or not the first shifting condition is satisfied. In step S45, the electronic controller 14 selects the actual cadence as the first reference value to determine whether or not the first shifting condition is satisfied. From step S46, the actual cadence and estimated cadence will not be distinguished and will simply be referred to as the cadence.

In step S46, the electronic controller 14 determines whether or not the cadence is greater than or equal to the first threshold value TH1. In a case where the electronic controller 14 determines that the cadence is greater than or equal to the first threshold value TH1, the electronic controller 14 proceeds to step S47. In a case where the electronic controller 14 determines that the cadence is not greater than or equal to the first threshold value TH1, the electronic controller 14 proceeds to step S52.

In step S47, the electronic controller 14 determines whether or not the cadence is greater than or equal to the third threshold value. In a case where the electronic controller 14 determines that the cadence is greater than or equal to the third threshold value, the electronic controller 14 proceeds to step S51. In a case where the electronic controller 14 determines that the cadence is not greater than or equal to the third threshold value, the electronic controller 14 proceeds to step S48.

In step S48, the electronic controller 14 determines whether or not the present transmission ratio of the human-powered vehicle A is the maximum transmission ratio. In a case where the electronic controller 14 determines that the present transmission ratio of the human-powered vehicle A is the maximum transmission ratio, the electronic controller 14 proceeds to step S51. In a case where the electronic controller 14 determines that the present transmission ratio of the human-powered vehicle A is not the maximum transmission ratio, the electronic controller 14 proceeds to step S49.

In step S49, the electronic controller 14 determines whether or not the first shifting condition for performing second shifting has been satisfied a predetermined number of times. In a case where the electronic controller 14 determines that the first shifting condition has been satisfied the predetermined number of times, the electronic controller 14 proceeds to step S50. In a case where the electronic controller 14 determines that the first shifting condition has not been satisfied the predetermined number of times, the electronic controller 14 proceeds to step S51.

In step S50, the electronic controller 14 executes second shifting based on the shifting execution condition. Upon completion of step S50, the electronic controller 14 ends the control.

In step S51, the electronic controller 14 determines whether or not a predetermined period has elapsed from a point of time at which the first predetermined condition was previously satisfied. More specifically, the electronic controller 14 determines whether the predetermined period has elapsed from the point of time at which the first reference value was obtained. In a case where the electronic controller 14 determines that the predetermined period has elapsed, the electronic controller 14 proceeds to step S41. In a case where the electronic controller 14 determines that the predetermined period has not elapsed, the electronic controller 14 executes step S51 again.

In step S52, the electronic controller 14 determines whether or not the cadence is less than or equal to the second threshold value. In a case where the electronic controller 14 determines that the cadence is less than or equal to the second threshold value TH2, the electronic controller 14 proceeds to step S53. In a case where the electronic controller 14 determines that the cadence is not less than or equal to the second threshold value TH2, the electronic controller 14 proceeds to step S56.

In step S53, the electronic controller 14 determines whether the transmission ratio of the human-powered vehicle A is the minimum transmission ratio. In a case where the electronic controller 14 determines that the present transmission ratio of the human-powered vehicle A is the minimum transmission ratio, the electronic controller 14 proceeds to step S56. In a case where the electronic controller 14 determines that the present transmission ratio of the human-powered vehicle A is not the minimum transmission ratio, the electronic controller 14 proceeds to step S54.

In step S54, the electronic controller 14 determines whether or not the first shifting condition for performing first shifting has been satisfied a predetermined number of times. In a case where the electronic controller 14 determines that the first shifting condition has been satisfied the predetermined number of times, the electronic controller 14 proceeds to step S55. In a case where the electronic controller 14 determines that the first shifting condition has not been satisfied the predetermined number of times, the electronic controller 14 proceeds to step S56.

In step S55, the electronic controller 14 executes first shifting based on the shifting execution condition. Upon completion of step S55, the electronic controller 14 ends the control.

In step S56, the electronic controller 14 determines whether or not a predetermined period has elapsed from a point of time at which the first predetermined condition was previously satisfied. In a case where the electronic controller 14 determines that the predetermined period has elapsed, the electronic controller 14 proceeds to step S41. In a case where the electronic controller 14 determines that the predetermined period has not elapsed, the electronic controller 14 executes step S56 again. The electronic controller 14 repetitively executes the second shifting control including the process from steps S41 to S56 while, for example, the human-powered vehicle A is traveling.

Fourth Embodiment

Figure 9:
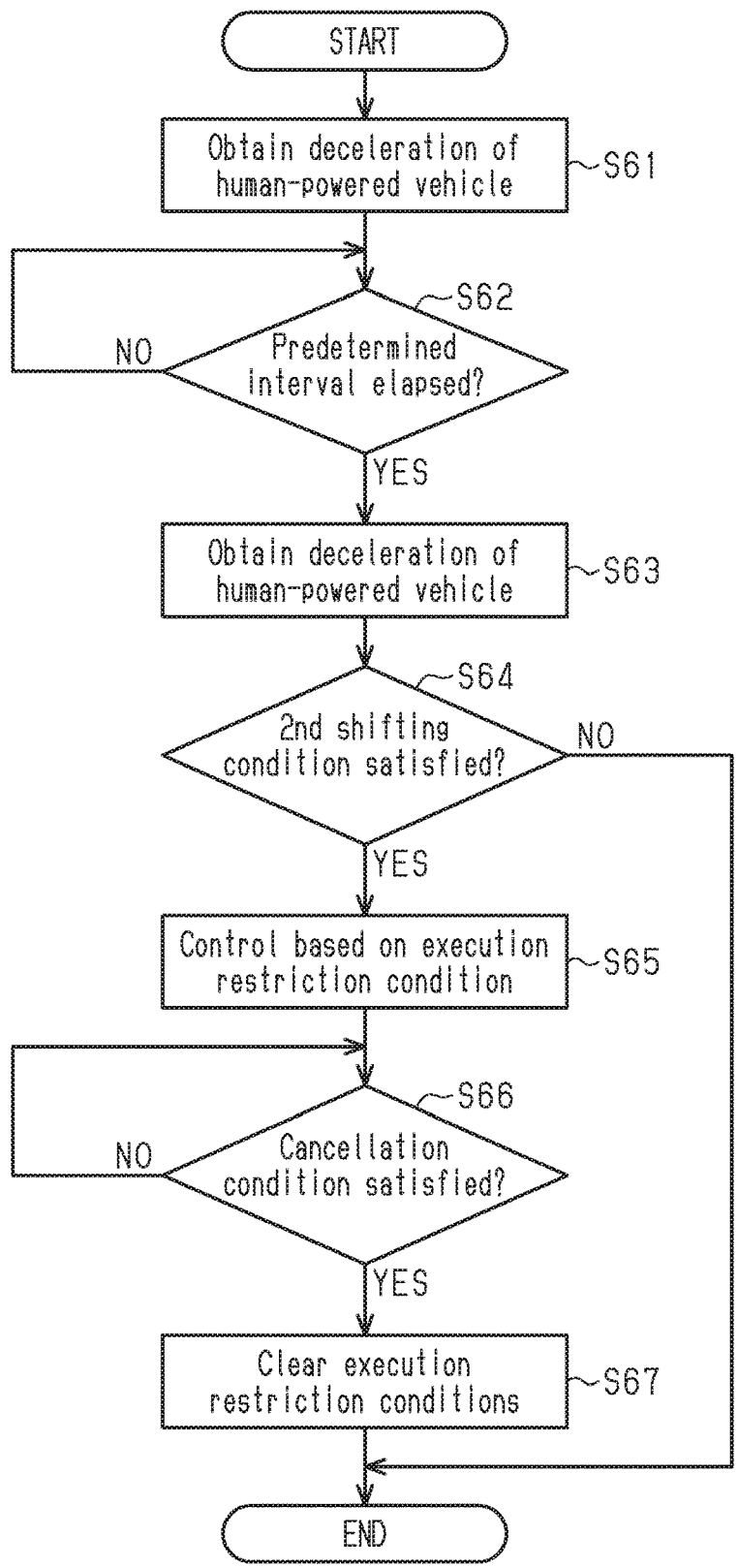
FIG. 9 is a flowchart showing one example of a third transmission restriction control executed by a control device in accordance with a fourth embodiment.

With reference to FIG. 9, a transmission system 10 in accordance with a fourth embodiment will now be described. In the transmission system 10 in accordance with the fourth embodiment, the electronic controller 14 executes shifting restriction control based on a plurality of second reference values indicating a deceleration tendency of the electronic controller 14. The shifting restriction control in accordance with the fourth embodiment is also referred to as the third shifting restriction control. In the description hereafter, same reference numerals are given to those components that are the same as the corresponding components of the transmission system 10 in accordance with each of the first to third embodiments. Such components will not be described in detail.

The electronic controller 14 executes the third shifting restriction control instead of or in addition to the first shifting restriction control. The third shifting restriction control is a control executed by the electronic controller 14 to restrict second shifting and cancel restriction of second shifting based on the second reference values.

The second reference values include decelerations of the human-powered vehicle A. The electronic controller 14 determines whether or not the second shifting condition is satisfied based on a plurality of decelerations of the human-powered vehicle A calculated at predetermined intervals. In a first example, the electronic controller 14 determines that the second shifting condition is satisfied and restricts shifting of the transmission ratio of the human-powered vehicle A in a case where at least one of successive ones of the plurality of decelerations of the human-powered vehicle A is greater than or equal to the second predetermined value. More specifically, the electronic controller 14 determines that the second shifting condition is satisfied and restricts shifting of the transmission ratio of the human-powered vehicle A in a case where at least one of successive ones of the plurality of decelerations of the human-powered vehicle A is greater than or equal to the second predetermined value that is greater than 0 m/s². Restriction of shifting of the transmission ratio of the human-powered vehicle A includes restricting second shifting that increases the transmission ratio of the human-powered vehicle. The electronic controller 14 determines that the second shifting condition is not satisfied and does not restrict shifting of the transmission ratio of the human-powered vehicle A in a case where successive decelerations of the human-powered vehicle A are both less than or equal to 0 m/s². The electronic controller 14 can determine whether or not the second shifting condition is satisfied based on a plurality of different second predetermined values and a plurality of successive decelerations of the human-powered vehicle A. The different second predetermined values include 0 m/s² and a value greater than 0 m/s². In a first example, the electronic controller 14 determines that the second shifting condition is satisfied and restricts shifting of the transmission ratio of the human-powered vehicle A in a case where at least one of successive decelerations of the human-powered vehicle A is greater than or equal to the second predetermined value that is 0 m/s² or greater or the second predetermined value that is greater than 0 m/s². In a second example, the electronic controller 14 determines that the second shifting condition is satisfied and restricts shifting of the transmission ratio of the human-powered vehicle A in a case where a majority of decelerations of the human-powered vehicle A are greater than or equal to the second predetermined value. In the present embodiment, the electronic controller 14 determines whether the second shifting condition is satisfied through the first example.

The predetermined intervals include at least one of a predetermined time interval and a predetermined distance interval. One example of a predetermined time interval is a time interval at which second reference values indicating the deceleration tendency are obtained. In one example, the predetermined time interval is fifty milliseconds. One example of a predetermined distance interval is a traveling distance of the human-powered vehicle A during which the obtained second reference values indicate the deceleration tendency. In one example, the predetermined distance interval is two meters.

The electronic controller 14 executes the third shifting restriction control, for example, in accordance with the process described below.

In step S61, the electronic controller 14 obtains the deceleration of the human-powered vehicle A. In step S62, the electronic controller 14 determines whether or not a predetermined interval has elapsed. In a case where the electronic controller 14 determines that the predetermined interval has elapsed, the electronic controller 14 proceeds to step S63. In a case where the electronic controller 14 determines that the predetermined interval has not elapsed, the electronic controller 14 executes step S62 again.

In step S63, the electronic controller 14 obtains the deceleration of the human-powered vehicle A again. In step S64, the electronic controller 14 determines whether or not the second shifting condition is satisfied. The electronic controller 14 determines whether or not at least one of the decelerations of the human-powered vehicle A successively obtained in steps S61 and S63 is greater than or equal to the second predetermined value. In a case where the electronic controller 14 determines that the second shifting condition has been satisfied, the electronic controller 14 proceeds to step S65. In a case where the electronic controller 14 determines that the second shifting condition has not been satisfied, the electronic controller 14 ends the third shifting restriction control.

In step S65, the electronic controller 14 sets at least one of the execution restriction conditions and restricts second shifting, which increases the transmission ratio of the human-powered vehicle A based on the execution restriction condition. In step S66, the electronic controller 14 determines whether or not the cancellation condition is satisfied. In a case where the cancellation condition has been satisfied, the electronic controller 14 proceeds to step S67. In a case where the electronic controller 14 determines that the cancellation condition has not been satisfied, the electronic controller 14 executes step S66 again.

In step S67, the electronic controller 14 clears all of the execution restriction conditions. The electronic controller 14 executes second shifting in accordance with whether or not the first shifting condition has been satisfied. The electronic controller 14 repetitively executes the third shifting restriction control including the process from steps S61 to S67 while, for example, the human-powered vehicle A is traveling. In a case where the execution restriction conditions are set by the third shifting restriction control, the electronic controller 14 does not execute second shifting in the first shifting control.

Fifth Embodiment

Figure 10:
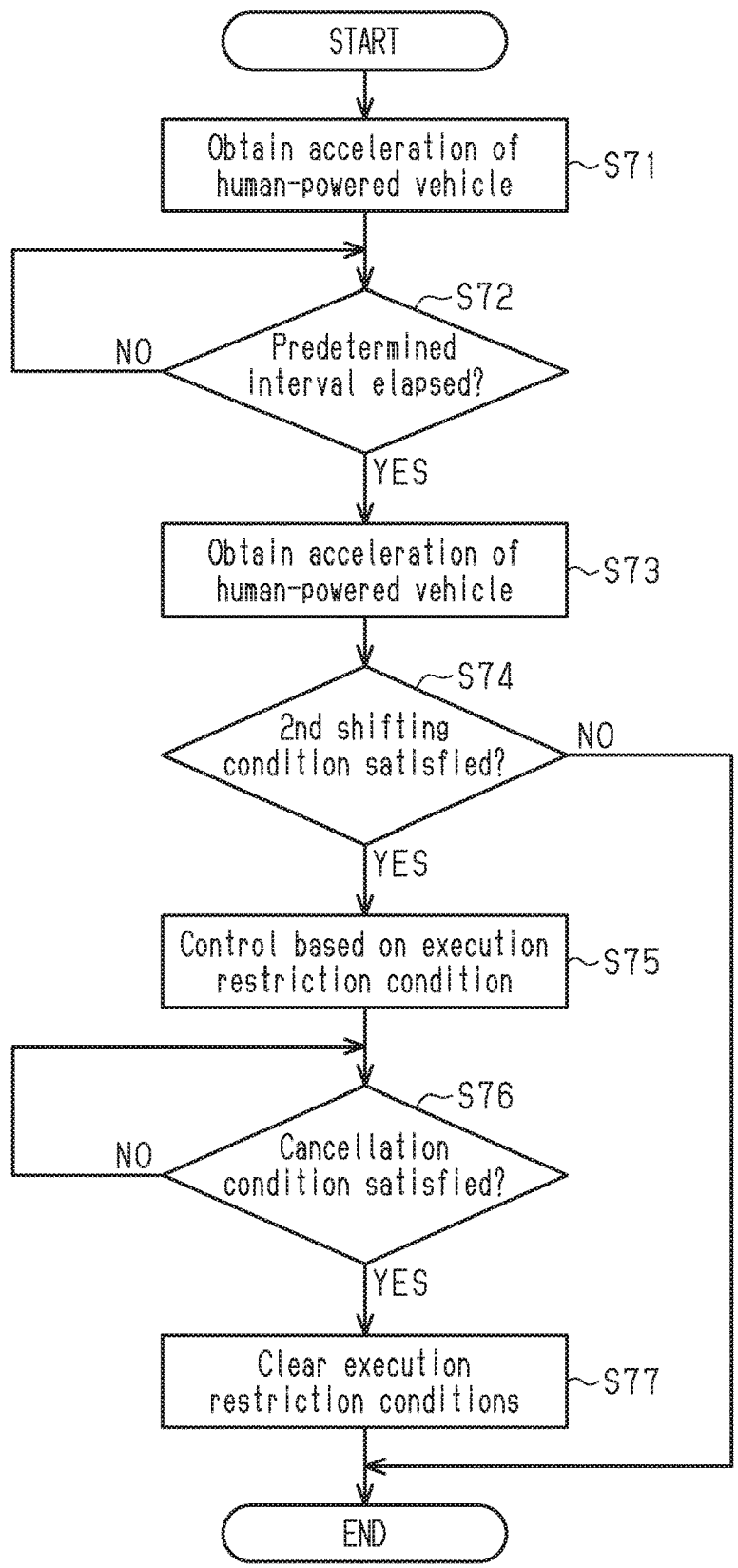
FIG. 10 is a flowchart showing one example of a fourth transmission restriction control executed by a control device in accordance with a fifth embodiment.

With reference to FIG. 10, a transmission system 10 in accordance with a fifth embodiment will now be described. In the transmission system 10 in accordance with the fifth embodiment, the electronic controller 14 executes shifting restriction control based on a plurality of second reference values indicating an acceleration tendency of the electronic controller 14. The shifting restriction control in accordance with the fifth embodiment is also referred to as the fourth shifting restriction control. In the description hereafter, same reference numerals are given to those components that are the same as the corresponding components of the transmission system 10 in accordance with each of the first to fourth embodiments. Such components will not be described in detail.

The electronic controller 14 executes the fourth shifting restriction control instead of or in addition to the second shifting restriction control. The fourth shifting restriction control is a control executed by the electronic controller 14 to restrict first shifting and cancel restriction of first shifting based on the second reference values.

The second reference values include accelerations of the human-powered vehicle A. The electronic controller 14 determines whether or not the second shifting condition is satisfied based on a plurality of accelerations of the human-powered vehicle A calculated at predetermined intervals. In a first example, the electronic controller 14 determines that the second shifting condition is satisfied and restricts shifting of the transmission ratio of the human-powered vehicle A in a case where at least one of successive ones of the plurality of accelerations of the human-powered vehicle A is greater than or equal to the first predetermined value. More specifically, the electronic controller 14 determines that the second shifting condition is satisfied and restricts shifting of the transmission ratio of the human-powered vehicle A in a case where at least one of successive ones of the plurality of accelerations of the human-powered vehicle A is greater than or equal to the first predetermined value that is greater than 0 m/s$^2$. Restriction of shifting of the transmission ratio of the human-powered vehicle A includes restricting first shifting that decreases the transmission ratio of the human-powered vehicle. The electronic controller 14 determines that the second shifting condition is not satisfied and does not restrict shifting of the transmission ratio of the human-powered vehicle A in a case where successive accelerations of the human-powered vehicle A are both less than or equal to 0 m/s$^2$. The electronic controller 14 can determine whether or not the second shifting condition is satisfied based on a plurality of different first predetermined values and a plurality of successive accelerations of the human-powered vehicle A. The different first predetermined values include 0 m/s$^2$ and a value greater than 0 m/s$^2$. In a first example, the electronic controller 14 determines that the second shifting condition is satisfied and restricts shifting of the transmission ratio of the human-powered vehicle A in a case where at least one of successive accelerations of the human-powered vehicle A is greater than or equal to the first predetermined value that is 0 m/s$^2$ or greater or the first predetermined value that is greater than 0 m/s$^2$. In a second example, the electronic controller 14 determines that the second shifting condition is satisfied and restricts shifting of the transmission ratio of the human-powered vehicle A in a case where a majority of accelerations of the human-powered vehicle A are greater than or equal to the first predetermined value. In the present embodiment, the electronic controller 14 determines whether the second shifting condition is satisfied in accordance with the first example.

The electronic controller 14 executes the fourth shifting restriction control, for example, in accordance with the process described below.

In step S71, the electronic controller 14 obtains the acceleration of the human-powered vehicle A. In step S72, the electronic controller 14 determines whether or not a predetermined interval has elapsed. In a case where the electronic controller 14 determines that the predetermined interval has elapsed, the electronic controller 14 proceeds to step S73. In a case where the electronic controller 14 determines that the predetermined interval has not elapsed, the electronic controller 14 executes step S72 again.

In step S73, the electronic controller 14 obtains the acceleration of the human-powered vehicle A again. In step S74, the electronic controller 14 determines whether or not the second shifting condition is satisfied. The electronic controller 14 determines whether or not at least one of the accelerations of the human-powered vehicle A successively obtained in steps S71 and S73 is greater than or equal to the first predetermined value. In a case where the electronic controller 14 determines that the second shifting condition has been satisfied, the electronic controller 14 proceeds to step S75. In a case where the electronic controller 14 determines that the second shifting condition has not been satisfied, the electronic controller 14 ends the fourth shifting restriction control.

In step S75, the electronic controller 14 sets at least one of the execution restriction conditions and restricts first shifting, which decreases the transmission ratio of the human-powered vehicle A based on the execution restriction condition. In step S76, the electronic controller 14 determines whether or not the cancellation condition is satisfied. In a case where the cancellation condition is satisfied, the electronic controller 14 proceeds to step S77. In a case where the electronic controller 14 determines that the cancellation condition has not been satisfied, the electronic controller 14 executes step S76 again.

In step S77, the electronic controller 14 clears all of the execution restriction conditions. The electronic controller 14 executes first shifting in accordance with whether or not the first shifting condition has been satisfied. The electronic controller 14 repetitively executes the fourth shifting restriction control including the process from steps S71 to S77 while, for example, the human-powered vehicle A is traveling. In a case where the execution restriction conditions are set by the fourth shifting restriction control, the electronic controller 14 does not execute first shifting in the first shifting control.

Modifications

The description related with the above embodiment exemplifies, without any intention to limit, applicable forms of a control device and a transmission system according to the present disclosure. The control device and transmission system according to the present disclosure is applicable to, for example, modifications of the above embodiment that are described below and combinations of at least two of the modifications that do not contradict each other. In the modifications described hereinafter, same reference numerals are given to those components that are the same as the corresponding components of the above embodiments. Such components will not be described in detail.

The electronic controller 14 can be configured to include a first control mode for executing at least one of the first shifting restriction control to the fourth shifting restriction control and a second control mode for restricting execution of the first shifting restriction control to the fourth shifting restriction control so that the electronic controller 14 controls the transmission 20 based on at least one of the first control mode and the second control mode. The electronic controller 14 can be configured to change the control mode from one of the first and second control modes to the other one of the first and second control modes in accordance with operating information of the operating device OD.

The electronic controller 14 uses acceleration of the human-powered vehicle A as a reference value indicating the acceleration tendency but can be configured to obtain the acceleration tendency from at least one of a change in cadence, a change in torque, and a change in vehicle speed. The electronic controller 14 uses deceleration of the human-powered vehicle A as a reference value indicating the deceleration tendency but can be configured to obtain the deceleration tendency from at least one of a change in cadence, a change in torque, and a change in vehicle speed.

The electronic controller 14 can be configured not to execute shifting restriction control in a case where the vehicle speed is less than or equal to a predetermined vehicle speed. One example of the predetermined vehicle speed is 10 km/h.

The electronic controller 14 can be configured to use the larger one of the actual cadence and the estimated cadence as the first reference value. In this case, the step of detecting torque can be omitted.

The second reference values in the fourth embodiment and the fifth embodiment can be obtained from at least one of a change in cadence, a change in torque, and a change in vehicle speed. The second reference values can be a combination of at least two of acceleration, deceleration, cadence change, torque change, and vehicle speed change of the human-powered vehicle A.

The human-powered vehicle A can be of any type. The human-powered vehicle A can be at least one of a road bike, a mountain bike, a cross bike, a city cycle, a cargo bike, a recumbent bike, and a kick scooter.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, in this specification, the phrase "at least one of" as used in this disclosure means "only one single choice" or "any combination of equal to or more than two choices" if the number of its choices is equal to or more than three.

What is claimed is:

1. A control device comprising:
an electronic controller configured to control a transmission to shift a transmission ratio of a human-powered vehicle in accordance with a first shifting condition set based on a first reference value,
the electronic controller being configured to control the transmission to restrict shifting of the transmission ratio of the human-powered vehicle regardless of the first shifting condition upon determining a second shifting condition set based on a second reference value is satisfied, the electronic controller being configured to restrict shifting of the transmission ratio for as long as the second condition is satisfied, and
the second reference value including at least one of a reference value indicating an acceleration tendency of the human-powered vehicle and a reference value indicating a deceleration tendency of the human-powered vehicle.

2. The control device according to claim 1, wherein the second reference value includes the acceleration of the human-powered vehicle, and
the electronic controller is configured to determine that the second shifting condition is satisfied and restrict the shifting of the transmission ratio of the human-powered vehicle upon determining the acceleration of the human-powered vehicle is greater than or equal to a first predetermined value.

3. The control device according to claim 2, wherein
the electronic controller is configured to determine that the second shifting condition is satisfied and is configured to restrict a first shifting that decreases the transmission ratio of the human-powered vehicle upon determining the acceleration of the human-powered vehicle is greater than or equal to the first predetermined value.

4. A control device comprising
an electronic controller configured to control a transmission to shift a transmission ratio of a human-powered vehicle in accordance with a first shifting condition set based on a first reference value,
the electronic controller being configured to control the transmission to restrict shifting of the transmission ratio of the human-powered vehicle regardless of the first shifting condition upon determining a second shifting condition set based on a second reference value is satisfied, and
the second reference value including at least one of a reference value indicating an acceleration tendency of the human-powered vehicle and a reference value indicating a deceleration tendency of the human-powered vehicle, the second reference value including the deceleration of the human-powered vehicle, and
the electronic controller being configured to determine that the second shifting condition is satisfied and is configured to restrict the shifting of the transmission ratio of the human-powered vehicle upon determining the deceleration of the human-powered vehicle is greater than or equal to a second predetermined value.

5. The control device according to claim 4, wherein
the electronic controller is configured to determine that the second shifting condition is satisfied and is configured to restrict a second shifting that increases the transmission ratio of the human-powered vehicle upon determining the deceleration of the human-powered vehicle is greater than or equal to the second predetermined value.

6. The control device according to claim 1, wherein
the first shifting condition includes a first threshold value and a second threshold value that is smaller than the first threshold value,
the electronic controller is configured to perform a second shifting that increases the transmission ratio of the human-powered vehicle upon determining the first reference value is greater than or equal to the first threshold value, and
the electronic controller is configured to perform a first shifting that decreases the transmission ratio of the human-powered vehicle upon determining the first reference value is less than or equal to the second threshold value.

7. The control device according to claim 1, wherein
the second reference value differs from the first reference value.

8. The control device according to claim 1, wherein
the first reference value includes at least one of a cadence, a torque acting on a crank of the human-powered vehicle, a power, and a vehicle speed of the human-powered vehicle.

9. The control device according to claim 8, wherein
the first reference value includes the cadence, and
the electronic controller is configured to restrict a second shifting that increases the transmission ratio of the human-powered vehicle upon determining the cadence is greater than or equal to a third threshold value that is greater than the first threshold value.

10. The control device according to claim 8, wherein
the first reference value includes the vehicle speed, and
the electronic controller is configured to calculate an estimated cadence of the human-powered vehicle from the vehicle speed.

11. The control device according to claim 10, wherein
the first reference value further includes the cadence and the torque acting on the crank of the human-powered vehicle, and
the electronic controller is configured to determine whether or not the first shifting condition is satisfied based on the estimated cadence upon determining the torque is less than or equal to a third predetermined value.

12. The control device according to claim 1, wherein
the electronic controller is configured to determine whether or not the first shifting condition is satisfied every predetermined period and is configured to shift the transmission ratio of the human-powered vehicle upon determining the first shifting condition is satisfied a predetermined number of times.

13. The control device according to claim 12, wherein
the predetermined period is set by rotation of a crank of the human-powered vehicle.

14. The control device according to claim 12, wherein
the predetermined number of times is three times.

15. A control device comprising
an electronic controller configured to control a transmission to shift a transmission ratio of a human-powered vehicle in accordance with a first shifting condition set based on a first reference value,
the electronic controller being configured to control the transmission to restrict shifting of the transmission ratio of the human-powered vehicle regardless of the first shifting condition upon determining a second shifting condition set based on a second reference value is satisfied, and
the second reference value including at least one of a reference value indicating an acceleration tendency of the human-powered vehicle and a reference value indicating a deceleration tendency of the human-powered vehicle, the second reference value including an acceleration of the human-powered vehicle, and
the electronic controller is configured to determine whether or not the second shifting condition is satisfied based on a plurality of accelerations of the human-powered vehicle calculated at predetermined intervals.

16. The control device according to claim 15, wherein
the electronic controller is configured to determine that the second shifting condition is satisfied and is configured to restrict the shifting of the transmission ratio of the human-powered vehicle upon determining at least one of successive ones of the plurality of accelerations of the human-powered vehicle is greater than or equal to a first predetermined value.

17. The control device according to claim 1, wherein
the second reference value includes a deceleration of the human-powered vehicle, and
the electronic controller is configured to determine whether or not the second shifting condition is satisfied based on a plurality of decelerations of the human-powered vehicle calculated at predetermined intervals.

18. The control device according to claim 17, wherein
the electronic controller is configured to determine that the second shifting condition is satisfied and is configured to restrict the shifting of the transmission ratio of the human powered vehicle upon determining at least one of successive ones of the plurality of decelerations of the human-powered vehicle is greater than or equal to a second predetermined value.

19. A transmission system comprising the control device according to claim 1, arid the transmission system further comprising:
the transmission.

* * * * *